United States Patent [19]
Balz et al.

[11] Patent Number: 4,581,296
[45] Date of Patent: Apr. 8, 1986

[54] MAGNETIC RECORDING MEDIA

[75] Inventors: Werner Balz, Limburgerhof; Jenoe Kovacs, Hessheim; Wulf Muenzner, Frankenthal; Hermann Roller, Ludwigshafen, all of Fed. Rep. of Germany

[73] Assignee: BASF Aktiengesellschaft, Fed. Rep. of Germany

[21] Appl. No.: 705,795

[22] Filed: Feb. 26, 1985

[30] Foreign Application Priority Data

Mar. 2, 1984 [DE] Fed. Rep. of Germany ....... 3407721

[51] Int. Cl.$^4$ .............................................. G11B 5/70
[52] U.S. Cl. .................................. 428/447; 252/62.54; 360/134; 360/135; 360/136; 427/128; 427/131; 428/421; 428/422; 428/694; 428/695; 428/900; 428/323; 428/328; 428/329
[58] Field of Search ............... 428/694, 695, 900, 447, 428/421, 422, 328, 329, 323, 411.1; 427/131, 128; 252/62.54; 360/134–135

[56] References Cited

U.S. PATENT DOCUMENTS

| 4,232,072 | 11/1980 | Pardee | 428/422 |
| 4,315,052 | 2/1982 | Takahashi et al. | 428/328 |
| 4,368,239 | 1/1983 | Nakajima | 428/421 |
| 4,388,376 | 6/1983 | Kubota | 428/522 |
| 4,411,966 | 10/1983 | Yamaguchi | 428/694 |
| 4,420,532 | 12/1983 | Yamaguchi et al. | 428/329 |
| 4,425,400 | 1/1984 | Yamaguchi et al. | 428/329 |
| 4,448,842 | 5/1984 | Uamaguchi et al. | 428/329 |
| 4,465,737 | 8/1984 | Miyatuka | 428/402 |

FOREIGN PATENT DOCUMENTS

| 3128005 | 5/1982 | Fed. Rep. of Germany . |
| 3217209 | 11/1982 | Fed. Rep. of Germany . |
| 1396124 | 6/1975 | United Kingdom . |
| 1448593 | 9/1976 | United Kingdom ........... 5/70 |

Primary Examiner—Ellis P. Robinson
Attorney, Agent, or Firm—Keil & Weinkauf

[57] ABSTRACT

Magnetic recording media consist of a non-magnetic base and a magnetic layer firmly bonded thereto, the magnetic layer containing further additives in addition to ferromagnetic metal powder, an organic binder, a metal oxide powder and conventional assistants.

1 Claim, No Drawings prior art procedure. In addition to the homopolymers of N-vinylpyrrolidone, its copolymers with comonomers such as vinyl esters of monocarboxylic acids of 2 to 9 carbon atoms, vinyl ethers, allyl alcohol and its esters with monocarboxylic acids of 2 to 9 carbon atoms, acrylic acid, methacrylic acid, maleic acid, acrylonitrile or styrene can be used for the novel magnetic recording media. An N-vinylpyrrolidone polymer consisting of from 0 to 50% by weight of vinyl acetate, vinyl propionate or acrylic acid and from 50 to 100% by weight of N-vinylpyrrolidone has proven particularly advantageous. The amount of the N-vinylpyrrolidone homopolymers or copolymers in the magnetic layer of the novel recording media is from 0.5 to 50, in particular from 0.8 to 30, % by weight, based on the amount of magnetic material.

The further composition of the novel magnetic recording media is known per se, and the said media are prepared by a conventional procedure.

The magnetic material used is a finely divided ferromagnetic metal powder. It consists predominantly of iron, cobalt and/or nickel. A powder which essentially consists of iron and contains individual acicular particles having a mean particle length of from 0.1 to 1.0 μm and a mean length/width ratio of from 4:1 to 20:1 is preferred. The BET surface area of the particles is preferably not less than 30 m$^2$/g, and the coercive force is from 60 to 100, preferaoly greater than 92, kA/m.

The organic binders which are used for the preparation of the magnetic layers are polyvinylformals, polyurethane elastomers, mixtures of polyisocyanates and fairly high molecular weight polyhydroxy compounds and vinyl chloride polymers containing more than 60% of vinyl chloride units, e.g. vinyl chloride copolymers with, as comonomers, vinyl esters of monocarboxylic acids of 2 to 9 carbon atoms, esters of aliphatic alcohols of 1 to 9 carbon atoms and ethylenically unsaturated carboxylic acids of 3 to 5 carbon atoms, such as the esters of acrylic acid, methacrylic acid or maleic acid, or these carboxylic acids themselves, and hydroxyl-containing vinyl chloride copolymers which can be prepared by partial hydrolysis of vinyl chloride/vinyl ester copolymers or direct copolymerization of vinyl chloride with hydroxyl-containing monomers, such as allyl alcohol or 4-hydroxybutyl or 2-hydroxyethyl (meth)acrylate. Other suitable binders are mixtures of polyurethane elastomers with polyvinylformals, phenoxy resins and PVC copolymers of the stated composition. Preferred binders are polyvinylformal binders, and polyurethane elastomer mixtures of the stated type, especially with polyvinylformals. Preferably used polyurethane elastomer binders are commercial elastomeric polyesterurethanes obtained from adipic acid, butane-1,4-diol and 4,4'-diisocyanatodiphenylmethane.

Suitable organic solvents for the preparation of the dispersion are the organic solvents conventionally used for this purpose, in particular aromatic hydrocarbons, such as benzene, toluene or xylene, alcohols, such as propanol or butanol, ketones, such as acetone or methyl ethyl ketone, ethers, such as tetrahydrofuran or dioxane, and mixtures of such solvents.

The dispersions contain further additives for the preparation of the magnetic layers, in particular dispersants, e.g. lecithins or long-chain phosphates.

The magnetic layers are prepared in a conventional manner. For this purpose, the magnetic material, together with the binder and sufficient solvent, is dispersed in a dispersing apparatus, e.g. a ball mill or a stirred ball mill, with the addition of the dispersant and the further additives. To bring the binder/pigment ratio to the desired value, the binder can be added to the mixture either in the solid state or in the form of from 20 to 60% strength solutions.

The magnetic dispersion is then applied to the non-magnetizable base with the aid of a conventional coating apparatus, e.g. a knife coater. Non-magnetic and non-magnetizable bases which can be used are the conventional bases, in particular films consisting of linear polyesters, such as polyethylene terephthalate, in general from 4 to 200, in particular from 6 to 36, μm thick. Before the still fluid coating mixture is dried on the base, an operation which is advantageously carried out at from 50° to 90° C. in the course of from 2 to 5 minutes, the anisotropic magnetic particles are oriented in the intended recording direction by the action of a magnetic field. Thereafter, the magnetic layer is calendered on a conventional apparatus by passing the coated base between polished rollers optionally heated to from 50° to 100° C., preferably from 60° to 80° C. The thickness of the magnetic layer is in general from 2 to 20, preferably from 3 to 15, μm.

The novel magnetic recording media possess a homogeneous coating of uniform thickness. The surface of the layer is smooth, the average peak-to-valley height ($R_z$) being less than 0.15 μm, and does not exhibit any defects, such as agglomerates and the like. Particularly noteworthy is the scratch resistance of the layer. These improvements to the quality of the layer manifest themselves in particular when the novel recording media are used as video tapes. In this way, improved signal-to-noise ratios and better modulation noise levels can be obtained, and the still life and durability can be substantially increased.

The Examples which follow illustrate the invention; the Comparative Experiments represent the state of the art. In the Examples and Comparative Experiments, parts and percentages are by weight, unless stated otherwise.

COMPARATIVE EXPERIMENT 1

700 parts of an acicular iron powder having a mean particle length of 0.3 μm and a coercive force of 99 kA/m, 91 parts of Al$_2$O$_3$ powder, consisting of spherical particles and having a mean particle diameter of 0.4 μm, in 722.8 parts of a 13% strength solution of a thermoplastic polyesterurethane obtained from adipic acid, butane-1,4-diol and 4,4'-diisocyanatodiphenylmethane in a mixture of equal parts of tetrahydrofuran and dioxane, 201.3 parts of a 20% strength solution of a phenoxy resin obtained from bisphenol A and epichlorohydrin and having a mean molecular weight of 30,000 and a hydroxyl content of 6%, in the abovementioned solvent mixture, and a further 264.1 parts of this solvent mixture are dispersed for 46 hours in a stirred ball mill which has a capacity of 6,000 parts by volume and contains 2,340 parts of ceramic balls, with the addition of 3.5 parts of stearic acid and 42 parts of a dispersant based on a mixture of an oxyethylated monophosphate and a salt of an ethylhexyl sulfosuccinate. 23.7 parts of methyl stearate were then added, and dispersing was continued for a further 5 hours. When dispersing was completed, 58 parts of a 50% strength solution of a triisocyanate, prepared from 3 moles of toluylene diisocyanate and 1 mole of 1,1,1-trimethylolpropane, in ethyl acetate were added, and stirring was continued for a further 15 minutes. After filtration of the dispersion, the latter was

MAGNETIC RECORDING MEDIA

The present invention relates to magnetic recording media which consist of a non-magnetic base and, firmly bonded thereto, a magnetic layer, the latter containing further additives in addition to ferromagnetic metal powder, an organic binder, metal oxide powder and conventional assistants.

In the production of magnetic recording media which consist of a base, which is generally flexible, and a magnetic layer of a magnetic powder finely dispersed in an organic binder, ferromagnetic metal powders are being used to an increasing extent as magnetic material, instead of the conventional oxide substances. Compared with the oxide magnetic materials, such as gamma-iron-(III) oxide or chromium dioxide, ferromagnetic powders, for example those based on iron or iron-cobalt alloys, possess a greater coercive force and higher residual induction, which makes possible the production of magnetic recording media which are both suitable for high recording densities and possess an improved signal-to-noise ratio. However, in the case of magnetic layers having this composition, the abrasion resistance of the surface of the layer is generally too low compared with magnetic layers containing oxide magnetic materials. Particularly in the case of video tapes, this results in poor durability and the formation of smeary deposits on the magnetic heads or even clogging up of the head gaps with abraded material.

In order to overcome these disadvantages, it has been proposed on several occasions to increase the hardness of the layer by adding hard non-magnetic oxide particles. For example, German Laid-Open Application DOS No. 3,211,780 describes the addition of abrasives having a hardness on Mohs' scale of not less than 6, in order to improve the life of the magnetic layer. The abrasives suggested, in addition to alpha-iron(III) oxide, were alumina, silica, chromium oxide, silicon carbide and others. Although this results in a more hardwearing magnetic layer, the addition of these abrasive particles causes increased abrasion of the magnetic head.

In order, on the one hand, to increase the abrasion resistance of the magnetic layer and, on the other hand, also to reduce the abrasive effect of the layer on the magnetic head, a number of measures have been proposed. For example, German Laid-Open Application DOS No. 3,128,005 and DOS No. 3,217,209 state that a combination of various non-magnetic, hard, finely divided powders having a hardness on Mohs' scale of not less than 6 achieves this effect. Furthermore, the addition of a fatty acid and of a fatty acid ester, in addition to the abrasive material, has been described (German Laid-Open Application DOS No. 3,211,779), as has the further combination with calcium carbonate (German Laid-Open Application DOS No. 3,203,601) or the admixing of the abrasion-resistant metal oxides with ethylene stearyl diamide (German Pat. No. 3,024,078). Although all of these proposals for solving the problem of increasing the abrasion resistance of the magnetic layer while reducing head abrasion are suitable for this purpose, they are unsatisfactory when the overall properties of the magnetic recording medium, e.g. the mechanical, electroacoustic and video properties, are taken into account.

It is an object of the present invention to provide magnetic recording media whose magnetic layer has such a composition that it optimally satisfies the set requirements, both in terms of its mechanical resistance and its recording and playback characteristics, and in terms of its effect on the parts of the apparatus with which it comes into contact.

We have found that this object is achieved by magnetic recording media comprising a non-magnetic base and, firmly bonded thereto, a magnetic layer consisting of finely divided ferromagnetic metal powder, one or more non-magnetic abrasion-resistant metal oxide powders, an organic binder and conventional assistants, if the layer contains, in addition to the ferromagnetic metal powder, the organic binder and a dispersant, (1) from 5 to 20% by weight of one or more non-magnetic metal oxide powders selected from the group consisting of $Al_2O_3$, $ZrO_2$, alpha-$Fe_2O_3$ and $Cr_2O_3$, (2) from 0.02 to 1.0% by weight of a fluorinated alkyl ester which is based on polyether chains, which may or may not possess side chains, and has a molecular weight of from 700 to 800, (3) from 0.05 to 1.0% by weight of a silicone rubber based on long-chain substituted oligomeric siloxanes having a molecular weight greater than 1,500, and (4) from 0.5 to 5.0% by weight of a homopolymer or copolymer of N-vinylpyrrolidone, having a molecular weight of less than 60,000, the percentages being based on the amount of ferromagnetic metal powder.

Non-magnetic metal oxide powders which can be used for the novel recording media are known. These are $Al_2O_3$, $ZrO_2$, alpha-$Fe_2O_3$ and $Cr_2O_3$. The mean size of these spherical particles is from 0.1 to 1.8, preferably from 0.3 to 1.5, $\mu$m. They are used in the stated amount, preferably from 8 to 15% by weight, based on the amount of magnetic material, and are either added directly to the magnetic dispersion or prepared as a separate dispersion in the binder intended for the magnetic layer, and then added to the dispersion of the magnetic material before it is applied to the base.

The component (2) which is incorporated into the novel recording medium has a fluorine content of from 1 to 10, preferably from 5 to 8, % by weight and is present in a concentration of from 0.02 to 1, preferably from 0.05 to 0.5, % by weight, based on the magnetic material contained in the magnetic layer.

Component (3) consists of a silicone rubber based on oligomeric siloxanes. It is preferably of the formula I

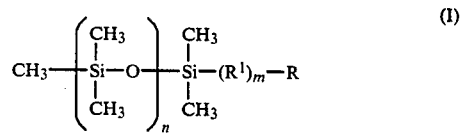

where n and m are identical or different integers from 20 to 25, $R^1$ is $CH_2$- or $CH_2$-O and R is carbonyl, hydroxyl or epoxide. The amount of component (3) in the magnetic layer is from 0.05 to 1.0, preferably from 0.1 to 5.0, % by weight, based on the magnetic material.

The N-vinylpyrrolidone homopolymers and copolymers (component (4)) present in the novel magnetic recording media do not belong to the class consisting of the binders. Although they are film-forming materials, they are not suitable for the production of self-supporting layers. The molecular weight of these polymers is less than 60,000, preferably less than 20,000. Their preparation by polymerization of N-vinylpyrrolidone is a applied in the form of a layer to a 10 μm thick polyethylene terephthalate film, followed by orientation of the magnetic particles by means of a permanent magnet. After drying, the 3 μm thick magnetic layer was calendered by passing the coated film between heated rollers (60° C., nip pressure 200 kg/cm), and the calendered material was then slit into ½ inch wide tapes. The durability and still life of these tapes were determined using a Philips V 2000 video recorder.

Durability

The number of hours before the first drop in output level of 20 dB lasting more than 15 μsec occurred during playback of a video cassette containing the ½ inch wide magnetic tape was determined.

Still life

The life in stop motion is the time (in minutes) for which a recorded signal can be played back in the "still frame" mode, i.e. with the magnetic tape stationary and the head wheel rotating, before the first drop in output level of 20 dB lasting more than 15 μsec occurs.

Signal-to-noise ratio

This is the ratio of the white level (100%) to the noise level, measured using the UPSF interference voltage meter of Rohde and Schwarz (>100 kHz).

The results of the measurements are shown in the Table.

EXAMPLES 1 TO 3

The procedure described in Comparative Experiment 1 was followed, except that alumina having a mean particle diameter of 0.4 μm, an alkyl ester having a fluorine content of 6% and a molecular weight of 740, a silicone rubber of the formula I, where n=20, m=23, $R^1$=CH$_2$ and R=epoxide, and a copolymer consisting of 60 mole percent of N-vinylpyrrolidone and 40 mole percent of vinyl acetate and having a molecular weight of 20,000 were added, in the amounts stated in the Table, to the magnetic dispersion. The results of the measurements are shown in the Table.

COMPARATIVE EXPERIMENTS 2 TO 7

The procedure described in Comparative Experiment 1 was followed, except that the substances stated in the Table were added, in the stated amounts, to the magnetic dispersion. The results of the measurements are shown in the Table.

TABLE

| | Al$_2$O$_3$ % | fluorinated alkyl ester % | silicone rubber % | polyvinyl-pyrrolidone % | S/N [dB] | Still life [min.] | durability [hours] |
|---|---|---|---|---|---|---|---|
| comparative experiment 1 | 13 | 0 | 0 | 0 | +8.0 | 1 | 1 |
| comparative experiment 2 | 3 | 0.1 | 0.5 | 0.8 | +9.0 | 0 | 0 |
| Example 1 | 16 | 0.1 | 0.3 | 1.4 | +5.0 | >60 | >50 |
| Example 2 | 11 | 0.1 | 0.5 | 0.8 | +9.0 | >60 | >50 |
| comparative experiment 3 | 11 | 0 | 0.5 | 0.8 | +9.0 | 10 | 5 |
| comparative experiment 4 | 11 | 0.3 | 0 | 0.8 | +9.5 | 10 | 3 |
| comparative experiment 5 | 11 | 0.3 | 0.1 | 0 | +7.5 | 30 | 10 |
| Example 3 | 8 | 0.1 | 0.1 | 1.6 | +9.5 | >60 | >50 |
| comparative experiment 6 | 8 | 1.1 | 0.1 | 0.8 | +9.0 | blocks | blocks |
| comparative experiment 7 | 8 | 0.1 | 1.1 | 0.8 | +8.5 | head runs off track | 0 |

We claim:
1. A magnetic recording medium comprising a non-magnetic base and, firmly bonded thereto, a magnetic layer consisting of finely divided ferromagnetic metal powder, one or more non-magnetic abrasion-resistant metal oxide powders, an organic binder and conventional assistants, wherein the layer contains, in addition to the ferromagnetic metal powder, the organic binder, conventional assistants and a dispersant,
(1) from 5 to 20% by weight of one or more non-magnetic metal oxide powders selected from the group consisting of Al$_2$O$_3$, ZrO$_2$, alpha-Fe$_2$O$_3$ and Cr$_2$O$_3$,
(2) from 0.02 to 1.0% by weight of a fluorinated alkyl ester which is based on polyether chains, which may or may not possess side chains, and has a molecular weight of from 700 to 800,
(3) from 0.05 to 1.0% by weight of a silicone rubber based on long-chain substituted oligomeric siloxanes having a molecular weight greater than 1,500, and
(4) from 0.5 to 5.0% by weight of a homopolymer or copolymer of N-vinylpyrrolidone, having a molecular weight of less than 60,000,
the percentages being based on the amount of ferromagnetic metal powder.

* * * * *